April 1, 1930.  A. Y. DODGE  1,752,478
BRAKE CONSTRUCTION
Filed March 10, 1924
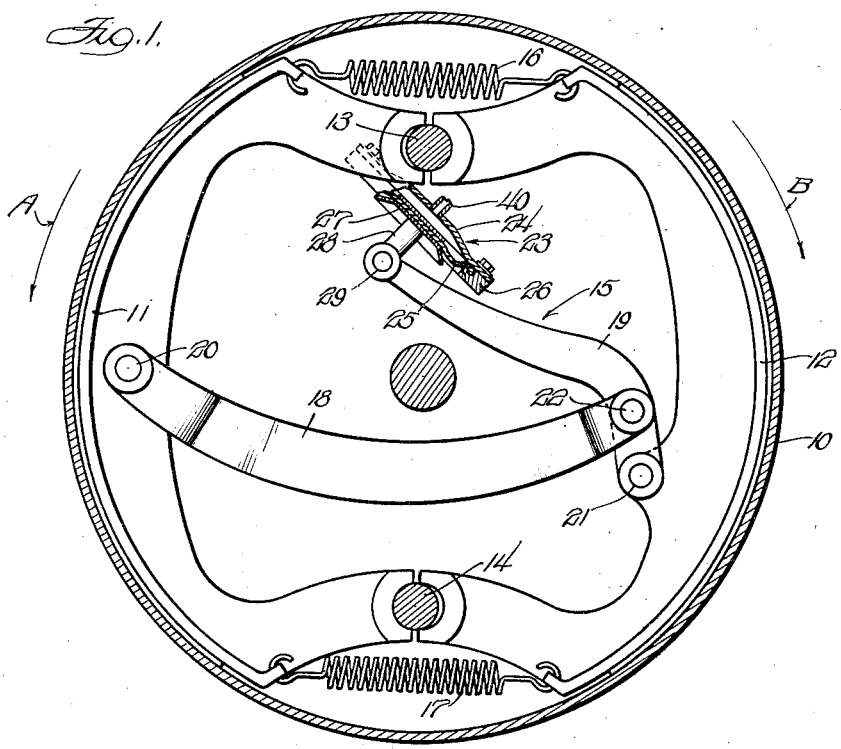
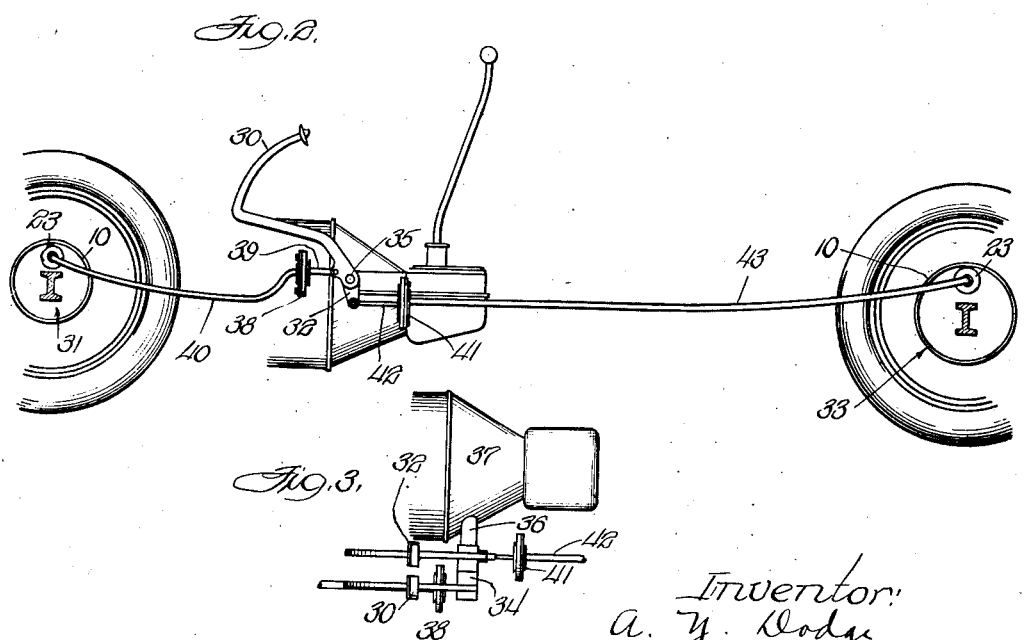
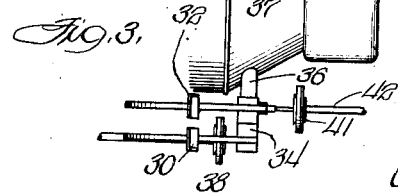
Inventor:
A. Y. Dodge Patented Apr. 1, 1930

1,752,478

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE CONSTRUCTION

Application filed March 10, 1924. Serial No. 697,982.

My invention relates to brake and clutch construction.

One of the objects of my invention is to provide an improved internal brake construction which will combine the advantages of the band brake and the shoe brake and which will be equally effective no matter in which direction the brake drum is rotating.

A further object of my invention is to provide an improved brake and clutch constrution in which the front set of brakes and the rear set of brakes may be actuated independently of each other and in which only two pedals are required for the control of the clutch and both sets of brakes.

Further objects will appear from the description and the claims.

In the drawings, in which my invention is illustrated—

Figure 1 is a side elevational view of an internal brake construction;

Fig. 2 is a somewhat diagrammatic side elevational view showing the brake and clutch construction, and Fig. 3 is a plan view of part of the brake and clutch construction.

The general idea of the brake construction is to provide an internal brake having a pair of diametrically opposite brake shoes bearing on the inner surface of the brake drum and pivotal abutments for each end of each brake shoe, each brake shoe changing from one pivotal abutment to another when the direction of rotation of the brake drum is changed so that the brake will be equally effective no matter in which direction the brake drum rotates.

Referring now to the drawings, in detail, the construction shown comprises a brake drum 10, a pair of extended resilient arcuate brake shoes 11 and 12 bearing on the inner surface of the brake drum, a pair of pivotal abutments 13 and 14 for the brake shoes 11 and 12, means 15 for exerting radial pressure outwardly on the brake shoes 11 and 12 at substantially diametrically opposite points, and springs 16 and 17 tending to hold the two shoes 11 and 12 in pivotal relation to the pivotal abutments 13 and 14.

The means for exerting radial pressure on the brake shoes comprise a pair of links 18 and 19 pivotally connected to the brake shoes at 20 and 21, and pivotally connected together at 22. A hydraulic diaphragm actuator 23 is provided for actuating the link 19. This actuator comprises a rigid plate 24, a flexible diaphragm 25 of fluid proof material, forming with the rigid plate 24 a fluid tight compartment, and a retaining ring 26 clampingly engaging the edge of the flexible diaphragm 25 to hold it snugly against the rigid plate 24. For transmitting the pressure from the flexible diaphragm 25 to the pivoted link 19, a rigid dished operating member 27 secured to the diaphragm 24 is provided having an arm 28 mounted thereon, pivotally connected at 29 with the end of the link 19. The pressure chamber between the rigid plate and the flexible diaphragm 25 is connected with a suitable source of fluid pressure described hereinafter.

In use, assuming first that the brake drum is rotating in the dirction of the arrow A (Fig. 1), and that fluid pressure is exerted on the flexible diaphragm 25, this will cause radial pressure to be exerted outwardly on the brake shoes 11 and 12 through the pivoted links 18 and 19. Due to the friction caused between the brake drum 10 and the brake shoes 11 and 12, the brake shoe 11 will be urged against the lower pivotal abutment 14 and the brake shoe 12 will be urged against the upper pivotal abutment 13. As a consequence of this action, the brake shoe 11 will have a slight pivotal movement about the lower pivotal abutment 14, the other end of this shoe swinging slightly away from the upper pivotal abutment 13, while the other shoe 12 will have a slight pivotal movement about the upper pivotal abutment 13 and the lower end of this brake shoe will swing slightly away from the lower pivotal abutment 14, thus both brake shoes will have a "self-energizing" action due to the fact that they are both pivotally held near their ends, and due to the friction between the shoes and drum.

When the brake drum is rotated in the opposite direction indicated by the arrow B in Fig. 1, the operation of the brake shoes is reversed. The brake shoe 12 will swing about the lower pivotal abutment 14, and the brake shoe 11 will swing about the upper pivotal abutment 13. Thus the brake will be equally effective and will be self-energizing to a large extent no matter in which direction the brake drum is rotating.

Referring now to the combination of the brake and clutch mechanism, shown in Figs. 2 and 3, the left hand pedal 30 is connected so as to control both the clutch mechanism and the front brakes 31, and the right hand pedal 32 is connected so as to control the rear brakes 33. Pressing down on the left-hand pedal 30 not only disengages the clutch but also applies the brakes to the front wheels. By this construction, the driver may apply either the front brakes or the rear brakes independently of each other, or may apply both sets simultaneously, and this without increasing the number of pedals over that used for controlling and pressing the rear wheel brakes and clutch. The specific manner in which the pedal 30 controls the clutch mechanism is not shown in detail, but in a general way the hub 34 of the pedal 30 is secured to a shaft 35 mounted in the bearing 36, this shaft 35 serving to transmit movement to the clutch mechanism enclosed in the housing 37.

The transmission from the pedals 30 and 32 to the brakes 31 and 33 is not shown in detail. In a general way, the transmission from the pedal 30 to the brake 31 comprises a fluid pressure actuator 38 connected to the pedal 30 by means of a link 39, and a fluid pressure actuator device 23, connected by the fluid pressure transmission tube 40, to the fluid pressure actuator 38. The aforementioned linkage involving the combined brake and clutch mechanism is more fully described and claimed in my copending application No. 386,363, filed August 16, 1929, the same constituting a division of this application.

Similarly, the transmission from the pedal 32 to the brake 33 comprising a fluid pressure actuator 41 connected to the lower end of the pedal 32 by means of a link 42, and a fluid pressure actuator device 23 adjacent the brake 33 and connected with the actuator 41 by means of the fluid pressure transmission tube 43.

Because of the fact that the links 18 and 19 are connected to the shoes 11 and 12 at diametrically opposite points, a relatively small movement of these links will be sufficient to give the required movement to the brake shoes. This enables a relatively short stroke fluid pressure actuator of the diaphragm type to be used.

Having thus described my invention, what I claim as new and desire to secure by Letters Patent of the United States is:

1. A brake comprising, in combination, a drum, a plurality of shoes engageable with the drum and individually shiftable to anchor at opposite ends according to the direction of rotation of the drum, and means acting on the shoes and bodily movable to exert a balanced spreading pressure on the shoes to apply the brake.

2. A brake comprising, in combination, a drum, a plurality of shoes engageable with the drum and individually shiftable to anchor at opposite ends according to the direction of rotation of the drum, and a linkage acting on the shoes and bodily movable to exert a balanced spreading pressure on the shoes to apply the brake.

3. A brake comprising, in combination, a drum, a plurality of shoes engageable with the drum and individually shiftable to anchor at opposite ends according to the direction of rotation of the drum, and expanding means forcing the shoes against the drum to apply the brake and bodily shiftable with the shoes to act substantially the same in either anchorage of the shoes.

4. A brake comprising, in combination, a drum, a pair of shoes engageable with the drum and individually shiftable to anchor at opposite ends according to the direction of rotation of the drum, and expanding means pivotally connected to the shoes and forcing the shoes against the drum to apply the brake and bodily shiftable with the shoes to act substantially the same in either anchorage of the shoes.

5. A brake comprising, in combination, a drum, fixed stops within the drum, shoes recessed at their ends to fit over said stops in such a manner as to prevent angular and lengthwise movement of the shoes, springs holding the shoes against the stops, and expanding means acting on said shoes between their ends to force them apart and bodily movable to act on the shoes with balanced pressures.

6. A brake comprising, in combination, a drum, fixed stops within the drum, shoes recessed at their ends to fit over said stops in such a manner as to prevent angular and lengthwise movement of the shoes, means urging the shoes against the stops, and bodily shiftable expanding means acting on said shoes to force them apart against the drum.

7. A brake comprising, in combination, a drum, a pair of shoes within the drum individually shiftable to anchor at opposite ends when the drum is turning in opposite directions, and a floating expanding linkage connecting the shoes.

8. A brake comprising, in combination, a drum, fixed stops on opposite sides of the drum serving as anchors, floating shoes notched at their ends to fit over the stops and restrained by the stops from movement crosswise of the ends of the shoes, means yieldingly urging the shoes against the stops, and floating balanced expanding means for spreading the shoes against the drum.

9. A brake comprising, in combination, a drum, fixed stops on opposite sides of the drum serving as anchors, floating shoes notched at their ends to fit over the stops and restrained by the stops from movement crosswise of the ends of the shoes, and means yieldingly urging the shoes against the stops.

10. A brake comprising, in combination, a drum, fixed stops on opposite sides of the drum serving as anchors, floating shoes notched at their ends to fit over the stops and restrained by the stops from movement crosswise of the ends of the shoes, and a lever pivoted to one shoe and linked to the other shoe and operable to spread the shoes against the drum.

11. A brake comprising, in combination, a drum, a pair of substantially semi-circular floating shoes within the drum, stops between opposite ends of the shoes and taking the braking torque, springs connecting the shoes at their opposite ends and urging them against the stops, and an operating lever pivoted to one shoe approximately at its center and linked to the other shoe approximately at its center.

12. A brake comprising, in combination, a drum, a pair of substantially semi-circular floating shoes within the drum, stops between opposite ends of the shoes and taking the braking torque, and an operating lever pivoted to one shoe approximately at its center and linked to the other shoe approximately at its center.

13. A brake comprising, in combination, a drum, a pair of shoes arranged within the drum having spaced separable ends, an anchor positioned between said ends, and a spring constraining the ends of said shoes towards said anchor and arranged between the anchor and the periphery of the drum.

14. A brake comprising, in combination, a drum having a frictional periphery, a pair of shoes arranged within the drum having separable spaced apart ends, an anchor positioned between said ends, and a spring constraining the ends of said shoes toward said anchor and arranged between the anchor and the periphery of the drum.

15. A brake comprising, in combination, a drum, a frictional device having separable ends arranged within said drum to be urged outwardly thereagainst, a stationary anchor positioned between said ends to be engaged by one end of the frictional means when the drum is rotating in one direction and to be engaged by the other end of said frictional means when the drum is rotating in the opposite direction, said anchor spaced inwardly from the periphery of the drum, and a yielding retracting means between the anchor and the periphery of the drum constraining said separable ends toward the anchor.

16. A brake comprising, in combination, a drum, a frictional device having separable ends arranged within said drum to be urged outwardly thereagainst, a stationary anchor positioned between said ends to be engaged by one end of the frictional means when the drum is rotating in one direction and to be engaged by the other end of said frictional means when the drum is rotating in the opposite direction, said anchor spaced inwardly from the periphery of the drum, and a spring connecting said separable ends extending along the chord of the drum between the anchor and the periphery of the drum.

In witness whereof, I have hereunto subscribed my name.

A. Y. DODGE.